(12) United States Patent
O'Keeffe et al.

(10) Patent No.: US 11,575,119 B2
(45) Date of Patent: Feb. 7, 2023

(54) COATED LEAD ACID BATTERY ELECTRODE PLATES; METHOD FOR MAKING COATED ELECTRODE PLATES AND LEAD ACID BATTERIES CONTAINING COATED ELECTRODE PLATES

(71) Applicant: TROJAN BATTERY COMPANY, LLC., Santa Fe Springs, CA (US)

(72) Inventors: Cormac O'Keeffe, Sligo (IE); Marvin Ho, Santa Fe Springs, CA (US)

(73) Assignee: TROJAN BATTERY COMPANY, LLC, Santa Fe Springs, CA (US)

( * ) Notice: Subject to any disclaimer, the term of this patent is extended or adjusted under 35 U.S.C. 154(b) by 184 days.

(21) Appl. No.: 17/167,593

(22) Filed: Feb. 4, 2021

(65) Prior Publication Data
US 2021/0193988 A1    Jun. 24, 2021

Related U.S. Application Data

(63) Continuation of application No. 16/396,542, filed on Apr. 26, 2019, now abandoned, which is a continuation of application No. 15/644,688, filed on Jul. 7, 2017, now Pat. No. 10,319,990.

(60) Provisional application No. 62/371,699, filed on Aug. 5, 2016.

(51) Int. Cl.
| | |
|---|---|
| H01M 4/02 | (2006.01) |
| H01M 4/22 | (2006.01) |
| H01M 10/12 | (2006.01) |
| H01M 4/73 | (2006.01) |
| H01M 4/66 | (2006.01) |
| H01M 4/56 | (2006.01) |
| H01M 4/36 | (2006.01) |
| H01M 4/68 | (2006.01) |
| H01M 50/44 | (2021.01) |
| H01M 50/46 | (2021.01) |
| H01M 50/403 | (2021.01) |
| H01M 50/411 | (2021.01) |
| H01M 10/06 | (2006.01) |

(52) U.S. Cl.
CPC ............. *H01M 4/22* (2013.01); *H01M 4/366* (2013.01); *H01M 4/56* (2013.01); *H01M 4/662* (2013.01); *H01M 4/685* (2013.01); *H01M 4/73* (2013.01); *H01M 10/121* (2013.01); *H01M 50/403* (2021.01); *H01M 50/411* (2021.01); *H01M 50/44* (2021.01); *H01M 50/46* (2021.01); *H01M 10/06* (2013.01)

(58) Field of Classification Search
None
See application file for complete search history.

(56) References Cited

U.S. PATENT DOCUMENTS

2013/0224579 A1* 8/2013 Berrang ................. H01M 4/73
429/204

\* cited by examiner

*Primary Examiner* — Jacob B Marks
(74) *Attorney, Agent, or Firm* — Duane Morris LLP

(57) ABSTRACT

Disclosed are electrode plates for a lead acid battery. The electrode plates are formed of an electrode plate having a face, the electrode plate comprising a lead or lead alloy grid coated with an active material and the electrode plates having a porous, non-woven mat comprised of polymer fibers coating on the face of the electrode plate, as well as a method for making the coated electrode plates and lead acid batteries containing the coated electrode plates.

65 Claims, 2 Drawing Sheets

COATED LEAD ACID BATTERY ELECTRODE PLATES; METHOD FOR MAKING COATED ELECTRODE PLATES AND LEAD ACID BATTERIES CONTAINING COATED ELECTRODE PLATES

CROSS REFERENCE TO RELATED APPLICATIONS

The present application is a continuation of U.S. patent application Ser. No. 16/396,542, filed Apr. 26, 2019, which is a continuation of U.S. patent application Ser. No. 15/644,688, filed Jul. 7, 2017, now U.S. Pat. No. 10,319,990, entitled "Coated Lead Acid Battery Electrode Plates; Method for Making Coated Electrode Plates and Lead Acid Batteries Containing Coated Electrode Plates", which application claims priority benefit from U.S. Provisional Application No. 62/371,699, filed Aug. 5, 2016, entitled "Coated Lead Acid Battery Components and Method of Making Same," the contents of each are hereby incorporated by reference in their entireties.

BACKGROUND OF THE INVENTION

Field of the Invention

This invention relates to the chemical and mechanical arts. In particular, this invention relates to electrode plates used in lead acid batteries, a method for making the electrode plates and lead acid batteries containing the electrode plates.

Background

A lead-acid battery includes a housing containing a positive electrode plate and a negative electrode plate. The electrode plates are typically formed of an electrode grid coated with an active material. While primarily constructed of lead, the electrode grids are often alloyed with antimony, calcium, or tin to improve their mechanical characteristics. Antimony is generally a preferred alloying material. The electrode plates are coated with active materials and separated by separator, all in contact with an electrolyte. There is a long felt need for electrode plates having improved mechanical and physical properties, such as durability and inertness in the harsh environment of a lead acid battery.

Electrospinning is a technique for producing polymeric fibers. Electrospinning utilizes the electrostatic attraction between a charged polymer and a grounded or oppositely charged collection plate to produce the fibers. There are a number of electrospinning variations, including using polymer solutions and melts. In one of these variations, an electrically charged polymer solution is fed through a small needle and the solution is sucked towards a grounded collector. In another variation, an electrically charged polymer melt is fed through a small needle and it is the melt that is sucked towards a grounded collector. The charge dissipates and a non-woven web or mat of fibers is produced on the collector.

SUMMARY OF THE INVENTION

Now there has been discovered an electrode plate for a lead acid battery that overcomes these and related disadvantages. In one aspect of the invention, the electrode plate comprises an electrode plate comprising a lead or lead alloy grid coated with an active material and a porous, non-woven mat comprised of polymer fibers coating on a face of the electrode plate. In one aspect, the electrode plate is a positive electrode plate and, in one aspect, the electrode plate is a negative electrode plate.

In another aspect of the invention, the electrode plate is made by electrospinning a polymer onto the face of the electrode plate to form a porous, non-woven mat coating comprised of polymer fibers on the surface of the electrode plate. And in another aspect, a lead acid battery comprises a housing containing a negative electrode plate having a first face and a positive electrode plate having a second face opposing the first face, where at least one of the opposing faces comprises a coating of a porous, non-woven mat comprised of polymer fiber, a separator disposed between the first and second electrode plate faces and an electrolyte immersing all of the negative electrode plate, the positive electrode plate and the separator. In one aspect, the lead acid battery is a flooded lead acid battery or a valve regulated lead acid battery. And in one aspect, the valve regulated lead acid battery is an AGS lead acid battery or a gel lead acid battery.

In one aspect of the invention, the lead alloy grid is a lead-antimony, a lead-calcium or a lead-tin alloy grid. In another aspect of the invention, the alloy is a lead-antimony. And in one aspect, the active material is a lead oxide active material.

In one aspect of the invention, the fibers have a fiber diameter of from about 5 nm and about 30 µm and, in one aspect, the fibers have a fiber diameter of from about 500 nm to about 1 µm. In one aspect, the polymer coating has a surface area of from about 5 $m^2/g$ to about 500 $m^2/g$ and, in one aspect, the polymer fiber coating has a surface area of from 50 m2/g to about 200 m2/g.

In one aspect, the polymer fiber coating has a porosity of from 30% to about 90% and, in one aspect, the polymer fiber coating has a porosity of from about 50% to about 70%. In one aspect, the polymer fiber coating has a thickness of from about 2 µm to about 2 mm, in another aspect, the polymer fiber coating has a thickness of from about 5 µm to about 500 µm and in another aspect, the polymer fiber coating has a thickness of from about 20 µm to about 250 µm.

In one aspect, the polymer fibers are cellulose acetate, polystyrene, polyethylene, Nylon 6, carboxymethyl cellulose, polyacrylic acid, polyvinyl alcohol, polylacetic acid, polyethylene-co-vinyl acetate, polymethyacrylate/tetrahydroperfluorooctylacrylate, polyethylene oxide, polymethacrylate, polyamide, polycaprolactone, polyethylimide, polycaprolactam, polyethylene terephthalate, polyphenyl ether, polyvinyl chloride, polyvinylidene chloride, polyvinylidene fluoride, poly(vinylidenefluoride-co-hexafluoropropylene, polyvinyl-pyridine, polylactic acid, polypropylene, polybutylene, polybutylene terephthalate, polyamide, polyimide, polycarbonate, polytetrafluoroethylene, polyester, acrylonitrile butadiene styrene, poly(methylmethacrylate), polyoxymethylene, polysulfone, styrene-acrylonitrile, polyacrylonitrile, styrene-butadiene rubber, ethylene vinyl acetate, styrene maleic anhydride, polyisoprene, natural rubber, cellulose, cellulose acetate, polyaniline, polyacrylonitrile, poly (ε-caprolactone), chitosan, Gelatin, Polyurethanes, poly (3-hydroxybutrate-co-3-hydroxyvalerate), polystyrene-block-polyisoprene-block-polystyrene fibers or combinations thereof. In another aspect, the polymer fibers are cellulose acetate, polystyrene, polyethylene or Nylon 6 fibers.

In one aspect, the polymer fiber coating further comprises an active agent. In another aspect, the active agent is natural rubber, RSS 1 or V 60 rubber, a macromolecule, a chelating agent, silica, carbon black or combinations thereof.

In one aspect, the polymer to be electrospun spun is formulated as a solution comprising 3the polymer and a solvent for the polymer. And in one aspect, the solvent is formic acid, dimethyl formamide, n-methylpyrrolidone, acetone, ethyl acetate, propyl acetate, water, dichloromethane, tetrahydrofuran, isopropyl alcohol, dicloromethane, ethanol, methanol, chloroform, acid acid, trifluoroacetic acid, trifluoroethanol, hexafluoro propanol, dimethylacetamide, carbon disulfide, cyclohexane, toluene, N-methylmorpholine, xylenes and dimethylsulfoxide or combinations thereof. In another aspect, the solvent is formic acid or dimethyl formamide.

In one aspect, the polymer to be electrospun spun is formulated as a polymer melt. And in one aspect, the polymer solution or polymer melt formulation further comprises an active agent. In still another aspect, the active agent is natural rubber, RSS 1 or V 60 rubber, a macromolecule, a chelating agent, silica, carbon black or combinations thereof.

BRIEF DESCRIPTION OF THE DRAWINGS

The accompanying drawings, together with the specification, illustrate exemplary embodiments, and, together with the description, serve to explain the principles of these embodiments.

DETAILED DESCRIPTION OF THE INVENTION

Particular embodiments of the invention are described below in considerable detail for the purpose of illustrating its principles and operation. However, various modifications may be made, and the scope of the invention is not limited to the exemplary embodiments described below. For example, while specific reference is made to flooded lead acid batteries, the invention is of equal use with other lead acid batteries, such as valve regulated lead acid batteries, including bi-polar lead acid batteries, AGS lead acid batteries and gel lead acid batteries.

Figure 1:
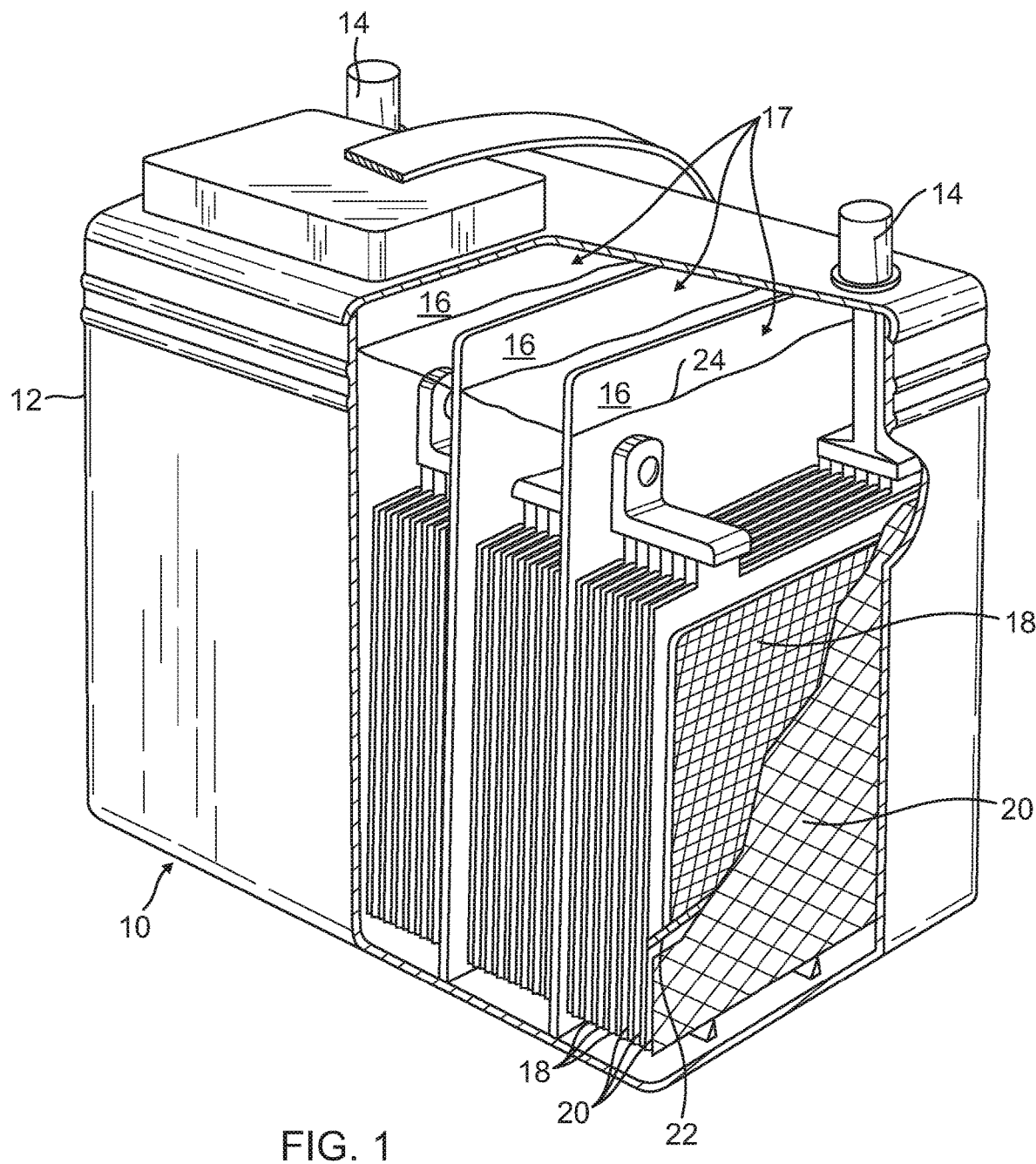
FIG. 1 is a partially cutaway perspective view illustrating one aspect of a lead acid battery with electrodes in accordance with one aspect of the invention.

FIG. 1 is a partially cutaway perspective view illustrating one aspect of a flooded lead acid battery with electrode plates in accordance with one aspect of the invention. The lead-acid battery 10 includes a housing 12 having positive and negative terminal posts 14 extending through the top of the housing to allow for electrical clamps to connect to the battery in operation.

A number of vertical partition walls 16 create a plurality of separate cell compartments 17. Each cell compartment contains a vertical stack of negative plates 18 and positive plates 20 having opposing faces spaced apart by separators 22 all immersed in an electrolyte 24, such as sulfuric acid ($H_2SO_4$).

Figure 2:
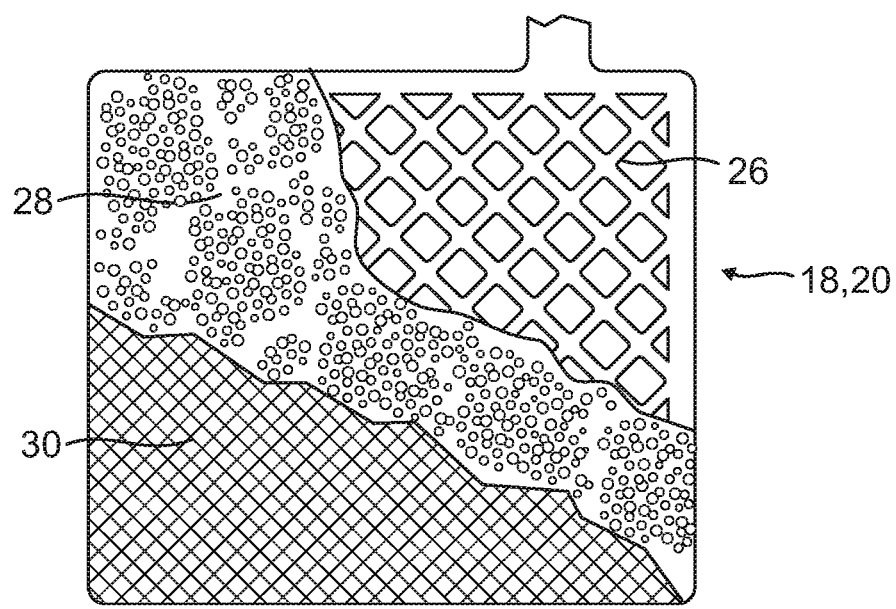
FIG. 2 is a partially cutaway front elevation view illustrating one aspect of an electrode plate coated with a porous, non-woven mat comprised of polymer fibers in accordance with one aspect of the invention.

Referring now to FIG. 2, there is shown a partially cutaway front elevation view illustrating one aspect of an electrode plate having coating with a porous, non-woven mat comprised of polymer fibers in accordance with one aspect of the invention. The negative and positive electrode plates 18, 20 are constructed with an underlying electrode grid 26. The electrode grid is primarily formed of lead and, typically, is alloyed with antimony, calcium or tin, generally with antimony.

In one aspect of the invention, an active material paste 28 is applied to the electrode grid. The positive and negative active material pastes generally comprise lead oxide (PbO) or lead (II). Suitable electrode plates are described in U.S. Pat. No. 8,546,006, which patent is herein incorporated by reference.

Now in accordance with one aspect of the invention, there has been discovered lead acid battery electrode plates 10 having a porous, non-woven web or mat coating 30 comprised of polymeric fibers on at least one face of the positive electrode plates and/or the negative electrode plates. The polymer fiber coating, which in one aspect is a porous, non-woven mat, can be made of any suitable polymer fiber. Representative polymer fibers include, without limitation, cellulose acetate, polystyrene, polyethylene and Nylon 6 polymer fibers. Other suitable polymer fibers include, without limitation carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), Polyolefins including but not limited to, Polypropylene (PP), Polybutylene (PB), Polybutylene terephthalate (PBT), Polyamide (PA), Polyimide (PI), Polycarbonate (PC), Polytetrafluoroethylene (PTFE), Polyester (PE), Acrylonitrile butadiene styrene (ABS), Poly(methyl methacrylate) (PMMA), Polyoxymethylene (POM), Polysulfone (PES), Styrene-acrylonitrile (SAN), Polyacrylonitrile (PAN), Styrene-butadiene rubber (SBR), Ethylene vinyl acetate (EVA), Styrene maleic anhydride (SMA), Polyisoprene (PI), Natural Rubber (NR), Cellulose, Cellulose Acetate (CA), Polyaniline (PANI), Polyacrylonitrile (PAN), Poly (ε-caprolactone) (PCL), Chitosan, Gelatin, Polyurethanes (PU), Poly (3-hydroxybutrate-co-3-hydroxyvalerate) (PHBV), polystyrene-block-polyisoprene-block-polystyrene fibers and combinations thereof.

It is a benefit of the polymer fiber coatings 30 that they are inert and durable. The polymer fiber coatings can survive the environment inside a lead acid battery. The non-woven web deposited on the surface of the plate will not get washed/removed from the surface of the plate.

It is a distinct advantage of the invention that the polymer fibers are nanofibers having a small fiber diameter, large surface area, high porosity and a controlled thickness. For example, in some embodiments, the fibers have a fiber diameter of from about 5 nm and about 30 μm and in some embodiments, the fibers have a fiber diameter of from about 500 nm to about 1 μm. In some other embodiments, the coating 30 has a surface area of from about 5 $m^2/g$ to about 500 $m^2/g$, and in some other embodiments, the coating has a surface area of from about 50 $m^2/g$ to about 200 $m^2/g$.

And, in some embodiments, the coating has a porosity of from about 30% to about 90%, in some other embodiments, the coating has a porosity of from about 50% to about 70%. And in some still other embodiments, the coating has a thickness of from about 2 μm to about 2 mm, in some embodiments, the coating has a thickness of from about 5

µm to about 500 µm, and in some embodiments, the coating has a thickness of from about 20 µm to about 250 µm.

The resulting non-woven web or mat of polymeric fiber improves the mechanical and physical properties of the electrode plates. For example, porosity can be controlled to allow electrolyte access to plate surface. It is an advantage of the invention that the unwoven mat coatings are very porous and allow easy transport of the $H_2SO_4$ electrolyte 24 to the electrode plate. $H_2SO_4$ is a medium for the electrochemical reactions that take place in the battery. $H_2SO_4$ is also a reactant, and it is a drawback of other less porous coatings that they may reduce its reactivity.

Further, the coatings 30 are durable and flexible. The coatings can expand and contract along with the electrode plates. Still further, the coatings can introduce functionalities via the action of the coating or active agents contained within the coating. These can include but are not limited to improved micro/nanostructure of the plate through optimized crystallization. The coating can establish nucleating points and/or face selective adsorption for controlled crystal growth of particles. The coating can introduce areas of high conductivity and capacitance to accelerate the electrochemical processes, reduce gassing and poisoning of plates, e.g. inhibiting migration of antimony to the negative plates. The coating can also produce solubility enhancement of lead based particles undergoing electrochemical conversion.

In another aspect of the invention, the coating 30 additionally contains at least one active agent. The active agent can be any material that further enhances the mechanical and physical properties of the coating. Useful active agents include, without limitation, natural rubber to reduce the migration of antimony from the positive to the negative plates (18, 20) and diminish the impact of antimony poisoning such as electrolyte expenditure and loss of capacity; other rubbers, such as RSS 1 and V 60 rubber; macromolecules, such as lignin, including Indulin AT, to decrease sulfation, chelating agents, such as acetylacetone and EDTA and carbon materials, including graphite and carbon black, such as CyPbrid 1 to increase charge acceptance and decrease sulfation. Other suitable active ingredients include sulfates, such as barium sulfate which can be employed in the unwoven mat as a nucleating agent and tin sulfate which can be integrated into the unwoven mat to dissolve into the lead acid battery electrolyte and reduce the particle size of $PbO_2$. In still a further aspect of the invention, carbon additives, such as graphite, can be introduced into the unwoven mat to produce areas of conductivity in the flooded lead acid battery and/or change the potential of the electrodes.

The amount of active agent in the coating 30 can vary depending on the active agent, the polymer fiber and the properties of the coating. Typically, the amount of active agent is from about 200:1 to about 1:1, and in some embodiments, from about 100:1 to about 10:1, based on weight:weight ratio.

In one aspect, the electrode grids 28 are primarily construct of lead and, in some embodiments, the lead is alloyed with antimony, calcium, or tin to improve the mechanical characteristics of the electrode plates. Antimony is generally a preferred alloying material. According to one embodiment, the positive electrode plates are made from a lead-antimony alloy. In one embodiment, the electrode grids are alloyed with about 2 wt % to about 11 wt % antimony. In another embodiment, the electrode grids are alloyed with between about 2 wt % and about 6 wt % antimony. The negative electrode grids are similarly made from an alloy of lead and antimony, but generally include less antimony than the alloy used for the positive electrode grids. The negative electrode grids also tend to be somewhat thinner than the positive electrode grids.

In another aspect of the invention, an active material paste 28 is applied to the electrode grid 26. The positive and negative active material pastes generally comprise lead oxide (PbO) or lead (II).

In one aspect of the invention, the coating 30 is porous, nanofiber mat formed by an electrospinning. process. And in one aspect, the electrospun polymeric fiber coating is formed using a charged polymer solution and a lead acid battery electrode plate as the grounded or oppositely charged collection plate. It is an advantage of the electrospinning method in accordance with the invention that a large variety of materials and solvents can be combined in the polymeric solution in order to tailor specific properties and functionalities. Suitable polymers include, without limitation, cellulose acetate, polystyrene, polyethylene and Nylon 6 fibers. Other suitable polymers include carboxymethyl cellulose (CMC), Polyacrylic acid (PAA), Polyvinyl alcohol (PVA), Polylacetic acid (PLA), Polyethylene-co-vinyl acetate, PEVA/PLA, Polymethyacrylate (PMMA)/tetrahydroperfluorooctylacrylate (TAN), Polyethylene oxide (PEO), Polymethacrylate (PMMA), Polyamide (PA), Polycaprolactone (PCL), Polyethyl imide (PEI) Polycaprolactam, Polyethylene terephthalate (PET), Polyphenyl ether (PPE), Polyvinyl chloride (PVC), Polyvinylidene chloride (PVDC), Polyvinylidene fluoride (PVDF), Poly(vinylidenefluoride-co-hexafluoropropylene (PVDF-HFP), Polyvinyl-pyridine, Polylactic acid (PLA), Polyolefins including but not limited to, Polypropylene (PP), Polybutylene (PB), Polybutylene terephthalate (PBT), Polyamide (PA), Polyimide (PI), Polycarbonate (PC), Polytetrafluoroethylene (PTFE), Polyester (PE), Acrylonitrile butadiene styrene (ABS), Poly(methyl methacrylate) (PMMA), Polyoxymethylene (POM), Polysulfone (PES), Styrene-acrylonitrile (SAN), Polyacrylonitrile (PAN), Styrene-butadiene rubber (SBR), Ethylene vinyl acetate (EVA), Styrene maleic anhydride (SMA), Polyisoprene (PI), Natural Rubber (NR), Cellulose, Cellulose Acetate (CA), Polyaniline (PANI), Polyacrylonitrile (PAN), Poly (ε-caprolactone) (PCL), Chitosan, Gelatin, Polyurethanes (PU), Poly (3-hydroxybutrate-co-3-hydroxyvalerate) (PHBV), polystyrene-block-polyisoprene-block-polystyrene fibers and combinations thereof.

Suitable solvents include liquids that are solvents for the polymer and that can sustain a charge, i.e., form a charged polymer solution. Representative solvents include, without limitation, formic acid and dimethyl formamide (DMF), with Nylon 6 in formic acid and cellulose acetate in DMF being presently preferred polymeric solution. Other suitable solvents include N-Methylpyrrolidone (NMP), acetone, ethyl acetate, propyl acetate, water, dichloromethane, tetrahydrofuran, isopropyl alcohol, dicloromethane, ethanol, methanol, chloroform, acid acid, trifluoroacetic acid, trifluoroethanol, hexafluoro propanol, dimethylacetamide, carbon disulfide, cyclohexane, toluene, N-methylmorpholine, xylenes and dimethylsulfoxide and combinations thereof. Typically, the amount of polymer in the solution is from about 5% to about 30%, in some embodiments, about 10% to about 25%, and in some embodiments, from about 15 to about 20%, based on % (w/v).

And in one aspect of the invention, the polymer solution contains at least one active agent to impart additional beneficial properties to the coatings. Representative active agents include, without limitation, natural rubber, synthetic rubber, such as RSS 1 and V 60 rubber, macromolecules, such as lignin, including Indulin AT, in a suitable solvent, such as DMF, to decrease sulfation. Other active ingredients include chelating agents, such as acetylacetone and EDTA, silica and carbon black, such as CyPbrid 1 to increase charge acceptance and decrease sulfation.

The solvent for the active agent can be the same as or different than the solvent for the polymer. For example, in one embodiment the active agent is Indulin AT and the solvent for the Indulin AT is dimethyl formamide (DMF). Typically, the amount of active agent in the polymer solution is from about 10% to about 50%, in some embodiments, about 20% to about 40%, and in some embodiments, from about 25% to about 40%, based on % (w/v).

Representative embodiments of the polymeric solution include:

18:1 polystyrene:indulin at 25% (w/v) in DMF

25% (w/v) Nylon-6 in Formic acid or

10:1 cellulose acetate:indulin AT 20% (w/v) in DMF

Parameters which may affect the formation of fibers include solution properties (e.g., conductivity, surface tension, viscosity, and elasticity), the distance between the capillary tube, electric potential at the capillary tip, and ambient parameters (e.g., humidity, solution temperature, and air velocity). In one aspect of the inventive method, a spinneret is connected to a high voltage direct current power supply, such as a 5 to 30 kV direct current power supply. The voltage supply may depend upon such factors as the type of polymer used, the desired porosity, and the rate of production.

The polymer solution is loaded into the spinneret and the electrically charged liquid extruded through the tip of the spinneret toward the surface of the electrode plate collector at a constant rate using a suitable pump. Typically, the flow rate is from about 0.001 ml/min to about 10 ml/min, in some embodiments, about 0.025 to about 1 ml/min, and in some embodiments, from about 0.1 to about 1 ml/min. The diameter of the fibers may be controlled by adjusting the solvent concentration in the polymer solution, adjusting a gap distance between the tip of the metallic needle and the grounded surface of the electrode structure.

And in one aspect, charged threads of the polymer solution are drawn to a negatively charged or grounded electrode plate collector positioned at a predetermined distance below the tip of the spinneret and the polymer solution coated on the surface of the plate until the desired coverage is achieved. In some embodiments, the plate is positioned from about 10 mm to about 1,000 cm below the tip of the spinneret, in some embodiments, about 1 to about 50 cm below the tip of the spinneret, and in some embodiments, from about 5 to about 20 cm below the tip of the spinneret. It is an advantage of the inventive method that it can be employed as a continuous process.

In accordance with another embodiment, the porous, non-woven mat is formed from a polymer melt. Polymers which are molten at high temperatures may be used in the melt process. Electrospinning of the polymer melt is similar to the process for electrospinning of the polymer solution, however, electrospinning of the polymer melt is performed in a vacuum environment. The charged melt jet, substrate that the melt is deposited on are typically encapsulated in a vacuum environment. Exemplary polymers which may be electrospun in melt form include Polyethylene (PE), Polypropylene (PP), Nylon 12, PA-12, Polyethylene terephthalate (PET), Polyethylene napthalate (PEN), PET/PEN blends, and combinations thereof.

In some embodiments, the polymer melt contains at least one active agent to impart additional beneficial properties to the coatings. Representative active agents include, without limitation, natural rubber, synthetic rubber, such as RSS 1 and V 60 rubber, macromolecules, such as lignin, including Indulin AT. Other active ingredients include chelating agents, such as acetylacetone and EDTA, silica and carbon black, such as CyPbrid 1.

In accordance with another aspect of the invention, the coated electrode plates 18, 20 are incorporated in flooded lead acid batteries 10 comprising a housing 12. The housing contains a negative electrode plate 18 with a first face and a positive electrode plate 20 with a second face opposing the first face; a separator 24 positioned between the first and second electrode plate faces and an electrolyte 26 immersing all of the negative electrode plate, the positive electrode plate and the separator.

The electrospun webs in accordance with the invention provide a number of benefits, such as improving the physical and mechanical properties of the lead acid batteries and imparts a number of positive effects on batteries' function. For example, dendrite formation on a negative plate can lead to short circuits that have detrimental effect on the operation of a battery. The deposition of a porous mat reduces this as the fibers act as a barrier of the dendrite growth on the +batteries' surface.

Another problem lead acid batteries encounter when working in a state of partial charge is the formation of hard sulfation of $PbSO_4$ in the battery plates. This can lead to reduction in capacity and cycle life of the battery. The electrospun coating can reduce this hard sulfation by integration of additives that control the nucleation of $PbSO_4$ crystals or bind to $PbSO_4$ limiting the crystal size growth on the surface.

From the above description of the invention, those skilled in the art will perceive improvements, changes and modifications. Such improvements, changes, and modifications are within the skill of the art and are intended to be covered by the appended claims.

What we claim is:

1. An electrode plate for a lead acid battery having a coating comprising:
    an electrode plate for a lead acid battery having a face, the electrode plate comprising a lead or lead alloy grid coated with an active material and
    a porous, non-woven mat comprised of polymer fibers coating on the face of the electrode plate.

2. The electrode plate of claim 1 wherein the lead alloy is a lead-antimony, a lead-calcium or a lead-tin grid.

3. The electrode plate of claim 2 wherein the alloy is a lead-antimony alloy.

4. The electrode plate of claim 2 wherein the active material is a lead oxide active material.

5. The electrode plate of claim 1 wherein the polymer fibers have a fiber diameter of from about 5 nm and about 30 µm.

6. The electrode plate of claim 1 wherein the polymer fibers have a fiber diameter of from 500 nm to about 1 µm.

7. The electrode plate of claim 1 wherein the polymer fiber coating has a surface area of from 5 m2/g to about 500 m2/g.

8. The electrode plate of claim 1 wherein the polymer fiber coating has a surface area of from 50 m2/g to about 200 m2/g.

9. The electrode plate of claim 1 wherein the polymer fiber coating has a porosity of from 30% to about 90%.

10. The electrode plate of claim 1 wherein the polymer fiber coating has a porosity of from about 50% to about 70%.

11. The electrode plate of claim 1 wherein the polymer fiber coating has a thickness of from about 2 µm to about 2 mm.

12. The electrode plate of claim 1 wherein the polymer fiber coating has a thickness of from about 5 µm to about 500 µm.

13. The electrode plate of claim 1 wherein the polymer fiber coating has a thickness of from about 20 µm to about 250 µm.

14. The electrode plate of claim 1 wherein the polymer fibers are cellulose acetate, polystyrene, polyethylene, Nylon 6, carboxymethyl cellulose, polyacrylic acid, polyvinyl alcohol, polylacetic acid, polyethylene-co-vinyl acetate, polymethyacrylate/tetrahydroperfluorooctylacrylate, polyethylene oxide, polymethacrylate, polyamide, polycaprolactone, polyethylimide, polycaprolactam, polyethylene terephthalate, polyphenyl ether, polyvinyl chloride, polyvinylidene chloride, polyvinylidene fluoride, poly(vinylidenefluoride-co-hexafluoropropylene), polyvinyl-pyridine, polylactic acid, polypropylene, polybutylene, polybutylene terephthalate, polyamide, polyimide, polycarbonate, polytetrafluoroethylene, polyester, acrylonitrile butadiene styrene, poly(methyl methacrylate), polyoxymethylene, polysulfone, styrene-acrylonitrile, polyacrylonitrile, styrene-butadiene rubber, ethylene vinyl acetate, styrene maleic anhydride, polyisoprene, natural rubber, cellulose, cellulose acetate, polyaniline, polyacrylonitrile, poly (ε-caprolactone), chitosan, Gelatin, Polyurethanes, poly (3-hydroxybutrate-co-3-hydroxyvalerate), polystyrene-block-polyisoprene-block-polystyrene fibers or combinations thereof.

15. The electrode plate of claim 14 wherein the polymer fibers are cellulose acetate, polystyrene, polyethylene or Nylon 6 fibers.

16. The electrode plate of claim 1 wherein the polymer fiber coating further comprises an active agent.

17. The electrode plate of claim 16 wherein the active agent is natural rubber, RSS 1 or V 60 rubber, a macromolecule, a chelating agent, silica, carbon black or combinations thereof.

18. The electrode plate of claim 1 wherein the electrode plate is a positive electrode plate for a lead acid battery.

19. The electrode plate of claim 1 wherein the electrode plate is a negative electrode plate for a lead acid battery.

20. A method for coating an electrode plate for a lead acid battery comprising the step of:
electrospinning a polymer onto the surface of an electrode plate collector, the electrode plate collector comprising a lead or lead alloy grid coated with an active material, to form a porous, non-woven mat coating comprised of polymer fibers on the surface of the electrode plate collector.

21. The method of claim 20 wherein the lead alloy grid is a lead-antimony, a lead-calcium or a lead-tin alloy grid.

22. The electrode plate of claim 21 wherein the alloy is a lead-antimony alloy.

23. The electrode plate of claim 22 wherein the active material is a lead oxide active material.

24. The method of claim 20 wherein the polymer fibers comprising the porous, non-woven mat coating have a fiber diameter of from 5 nm and about 30 µm.

25. The method of claim 20 wherein the polymer fibers comprising the porous, non-woven mat coating have a fiber diameter of from 500 nm to about 1 µm.

26. The method of claim 20 wherein the polymer fiber coating has a surface area of from 5 m2/g to about 500 m2/g.

27. The method of claim 20 wherein the polymer fiber coating has a surface area of from 50 m2/g to about 200 m2/g.

28. The method of claim 20 wherein the polymer fiber coating has a porosity of from 30% to about 90%.

29. The method of claim 20 wherein the polymer fiber coating has a porosity of from about 50% to about 70%.

30. The method of claim 20 wherein the polymer fiber coating has a thickness of from about 2 µm to about 2 mm.

31. The method of claim 20 wherein the polymer fiber coating has a thickness of from about 5 µm to about 500 µm.

32. The method of claim 20 wherein the polymer fiber coating has a thickness of from about 20 µm to about 250 µm.

33. The method of claim 20 wherein the polymer fibers are cellulose acetate, polystyrene, polyethylene, Nylon 6, carboxymethyl cellulose, polyacrylic acid, polyvinyl alcohol, polylacetic acid, polyethylene-co-vinyl acetate, polymethyacrylate/tetrahydroperfluorooctylacrylate, polyethylene oxide, polymethacrylate, polyamide, polycaprolactone, polyethylimide, polycaprolactam, polyethylene terephthalate, polyphenyl ether, polyvinyl chloride, polyvinylidene fluoride, poly(vinylidenefluoride-co-hexafluoropropylene), polyvinyl-pyridine, polylactic acid, polypropylene, polybutylene, polybutylene terephthalate, polyamide, polyimide, polycarbonate, polytetrafluoroethylene, polyester, acrylonitrile butadiene styrene, poly (methyl methacrylate), polyoxymethylene, polysulfone, styrene-acrylonitrile, polyacrylonitrile, styrene-butadiene rubber, ethylene vinyl acetate, styrene maleic anhydride, polyisoprene, natural rubber, cellulose, cellulose acetate, polyaniline, polyacrylonitrile, poly (ε-caprolactone), chitosan, Gelatin, Polyurethanes, poly (3-hydroxybutrate-co-3-hydroxyvalerate), polystyrene-block-polyisoprene-block-polystyrene fibers or combinations thereof.

34. The method of claim 33 wherein the polymer fibers are cellulose acetate, polystyrene, polyethylene or Nylon 6 fibers.

35. The method of claim 20 further comprising the step of formulating the polymer to be electrospun spun as a solution comprising the polymer and a solvent for the polymer.

36. The method of claim 35 wherein the polymer solution further comprises an active agent.

37. The method of claim 36 wherein the active agent is natural rubber, RSS 1 or V 60 rubber, a macromolecule, a chelating agent, silica, carbon black or combinations thereof.

38. The method of claim 35 wherein the solvent is formic acid, dimethyl formamide, n-methylpyrrolidone, acetone, ethyl acetate, propyl acetate, water, dichloromethane, tetrahydrofuran, isopropyl alcohol, dicloromethane, ethanol, methanol, chloroform, acid acid, trifluoroacetic acid, trifluoroethanol, hexafluoro propanol, dimethylacetamide, carbon disulfide, cyclohexane, toluene, N-methylmorpholine, xylenes and dimethylsulfoxide or combinations thereof.

39. The method of claim 38 wherein the solvent is formic acid or dimethyl formamide.

40. The method of claim 33 further comprising the step of formulating the polymer to be electrospun spun as a polymer melt.

41. The method of claim 40 wherein the polymer melt further comprises an active agent.

42. The method of claim 41 wherein the active agent is natural rubber, RSS 1 or V 60 rubber, a macromolecule, a chelating agent, silica, carbon black or combinations thereof.

43. The method of claim 33 wherein the electrode plate collector is a positive electrode plate for a lead acid battery.

44. The method of claim 33 wherein the electrode plate collector is a negative electrode plate for a lead acid battery.

45. A lead acid battery comprising:
a housing containing
a negative electrode plate for a lead acid battery having a first face and
a positive electrode plate for a lead acid battery having a second face opposing the first face, where the electrode plates are comprised of a lead or lead alloy grid coated with an active material;
a separator disposed between the first and second electrode plate faces and an electrolyte immersing the negative electrode plate, the positive electrode plate the separator;
at least one of the opposing faces a coating of a porous, non-woven mat comprised of polymer fiber.

46. The electrode plate of claim 45 wherein the lead alloy grid is a lead-antimony, a lead-calcium or a lead-tin alloy grid.

47. The electrode plate of claim 46 wherein the alloy is an antimony.

48. The electrode plate of claim 45 wherein the active material is a lead oxide active material.

49. The lead acid battery of claim 45 wherein the polymer fibers have a fiber diameter of from 5 nm and about 30 μm.

50. The electrode plate of claim 45 wherein the polymer fibers have a fiber diameter of from 500 nm to about 1 μm.

51. The lead acid battery of claim 45 wherein the polymer fiber coating has a surface area of from 5 m2/g to about 500 m2/g.

52. The lead acid battery of claim 45 wherein the polymer fiber coating has a surface area of from 50 m2/g to about 200 m2/g.

53. The lead acid battery of claim 45 wherein the polymer fiber coating has a porosity of from 30% to about 90%.

54. The lead acid battery of claim 45 wherein the polymer fiber coating has a porosity of from about 50% to about 70%.

55. The lead acid battery of claim 45 wherein the polymer fiber coating has a thickness of from about 2 μm to about 2 mm.

56. The lead acid battery of claim 45 wherein the polymer fiber coating has a thickness of from about 5 μm to about 500 μm.

57. The lead acid battery of claim 45 wherein the polymer fiber coating has a thickness of from about 20 μm to about 250 μm.

58. The lead acid battery of claim 45 wherein the polymer fibers are cellulose acetate, polystyrene, polyethylene, Nylon 6, carboxymethyl cellulose, polyacrylic acid, polyvinyl alcohol, polylactic acid, polyethylene-co-vinyl acetate, polymethyacrylate/tetrahydroperfluorooctylacrylate, polyethylene oxide, polymethacrylate, polyamide, polycaprolactone, polyethylimide, polycaprolactam, polyethylene terephthalate, polyphenyl ether, polyvinyl chloride, polyvinylidene chloride, polyvinylidene fluoride, poly(vinylidenefluoride-co-hexafluoropropylene, polyvinyl-pyridine, polylactic acid, polypropylene, polybutylene, polybutylene terephthalate, polyamide, polyimide, polycarbonate, polytetrafluoroethylene, polyester, acrylonitrile butadiene styrene, poly(methyl methacrylate), polyoxymethylene, polysulfone, styrene-acrylonitrile, polyacrylonitrile, styrene-butadiene rubber, ethylene vinyl acetate, styrene maleic anhydride, polyisoprene, natural rubber, cellulose, cellulose acetate, polyaniline, polyacrylonitrile, poly (ε-caprolactone), chitosan, Gelatin, Polyurethanes, poly (3-hydroxybutrate-co-3-hydroxyvalerate), polystyrene-block-polyisoprene-block-polystyrene fibers or combinations thereof.

59. The lead acid battery of claim 58 wherein the polymer fibers are cellulose acetate, polystyrene, polyethylene or Nylon 6 fibers.

60. The lead acid battery of claim 45 wherein the polymer fiber coating further comprises an active agent.

61. The lead acid battery of claim 60 wherein the active agent is natural rubber, RSS 1 or V 60 rubber, a macromolecule, a chelating agent, silica, carbon black or combinations thereof.

62. The lead acid battery of claim 45 wherein the lead acid battery is a flooded lead acid battery or a valve regulated lead acid battery.

63. The lead acid battery of claim 62 wherein the lead acid battery is a flooded lead acid battery.

64. The lead acid battery of claim 62 wherein the lead acid battery is a valve regulated lead acid battery.

65. The lead acid battery of claim 64 wherein the valve regulated lead acid battery is an AGS lead acid battery or a gel lead acid battery.

* * * * *